Sept. 6, 1949.  A. E. WELIN-BERGER  2,481,376
COUPLING FOR PIPE CONDUITS
Filed June 6, 1947
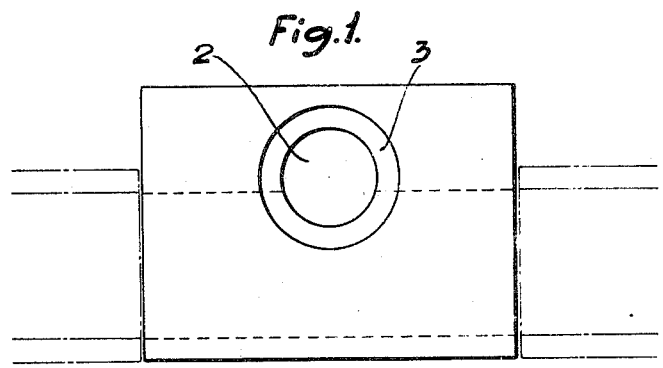
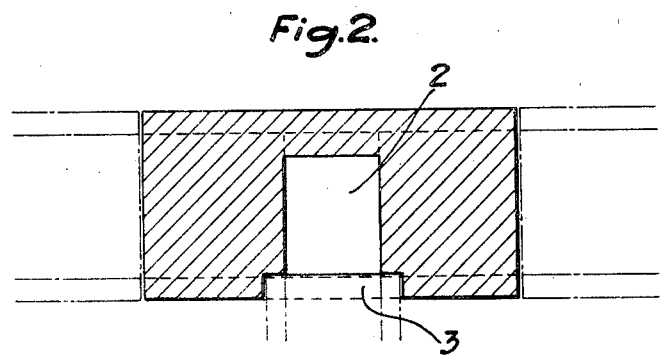
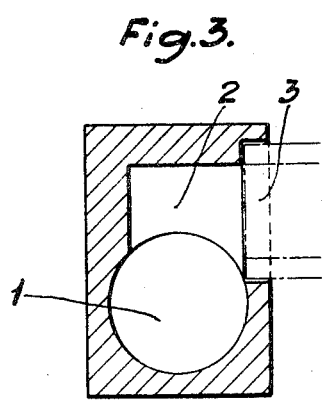
INVENTOR
AXEL EFRAIM WELIN-BERGER
BY Otto Munk
HIS ATTY Patented Sept. 6, 1949

2,481,376

UNITED STATES PATENT OFFICE 2,481,376

COUPLING FOR PIPE CONDUITS

Axel Efraim Welin-Berger, Halmstad, Sweden
Application June 6, 1947, Serial No. 753,017
In Sweden September 3, 1943

Section 1, Public Law 690, August 8, 1946
Patent expires September 3, 1963

2 Claims. (Cl. 285—105)

The present invention refers to a coupling housing for the connection of a trunk conduit and a branch conduit of a pipe system for surface drainage, and the invention is principally distinguished by the feature that said housing is provided with a through-passage adapted to form a portion of the trunk conduit, as well as with a circular aperture opening in a vertical wall parallel to said passage and also defining the bounds of the housing itself, said aperture being in direct communication with said through-passage on a level so much higher than that of the through-passage that the liquid from the branch conduit will discharge freely into the passage, in order that the maximum drainage of the liquid through the branch conduit shall be permitted to proceed without being disturbed by the supply of liquid through the trunk conduit, and that the difference in elevation shall become the least possible at all water-levels; the trunk- and branch conduit alike.

A form of embodiment of the invention is illustrated in the accompanying drawing. Fig. 1 shows the housing viewed from that side at which the connection with the branch conduit is effected. Fig. 2 shows a horizontal section of the housing on level with and through the center of the branch conduit. Fig. 3 shows a vertical section of the housing through the center line of the branch conduit.

Extending throughout the entire length of the housing is an opening 1 corresponding to that of the trunk conduit, the housing thus forming a part of said trunk conduit.

Provided in one of the longitudinal sides of the housing, in a direction at right angles or obliquely to the other longitudinal side, is an opening 2 corresponding to the internal section of the branch conduit, and preferably located on such a level that the maximum drain in the trunk conduit may proceed without being disturbed by the liquid supply from the branch conduit.

The outer portion of opening 2 is widened into a section 3, corresponding to the external section of the branch conduit, for the purpose of retaining the branch conduit in a safe position in the housing.

Obviously, openings 1, 2 and 3 may be made to dimensions other than above indicated, besides which the branch conduit may be connected to the coupling housing at an angle more or less oblique. Likewise, the openings 2 and 3 may be provided in the two longitudinal sides of the housing, thus providing for branch conduits to be connected thereto from both sides.

The present invention is of great importance to covered drainage. The present day practise is, either the coupling of a subsidiary to a trunk conduit is effected by the provision of a hole in the side of the trunk conduit, wherein the branch conduit is inserted, or in such a manner that holes of the same size are punched into the upper portion of the trunk conduit and into the lower portion of the branch conduit, whereupon the latter is placed upon the trunk conduit in such a manner that both holes coincide. Another method often practised for effecting the described connection is characterized by that the branch conduit is connected flush onto a pipe in the trunk conduit, which pipe is provided with a short branch.

As far as the two first-mentioned methods are concerned, the coupling will have to be effected by a skilled person. In the punching of the holes into the pipes a considerable loss of material is frequently caused by the fact that many pipes will burst or become damaged in some other way. Add to this that these couplings require considerable time for their completion. In view of the facts stated above, such couplings become rather expensive in use. Practical experience has also shown that the final results have quite often been all, but satisfactory.

The method involving a trunk conduit with a branch for side conduits also suffers from its disadvantage, partly by reason of the fact that the branches readily break in transports, and also by the fact that the supply of the water from the side, will, for technical reasons in the manufacture of the pipes, frequently have to take place at a level much lower than that of the center of the trunk conduit, so that all such coupling impede the drain of the water, resulting in the damming up of the water, both in the trunk conduit and, when it carries larger volumes of water, the branch conduit suffers as well.

With the use of the present coupling housing, all of above-mentioned drawbacks are obviated. The very act of attaching the coupling does not require any great skill and is done without any damage to the pipe, while the time consumed is practically at a minimum. By reason of its shape and the absence of projecting parts, the housing is not subjected to damage in transport, and as the water is supplied from the branch conduit to the trunk conduit on such a level that the least possible obstruction to the flow of the water in the trunk conduit might arise. The water from the branch conduit will, as a rule, be supplied to the trunk line by falling freely within the housing, and the draining will proceed in the main line without any impeding effect by the water from the branch conduit. A further and most important advantage to the coupling is that branch conduits of all dimensions may be coupled to the main conduit. In draining, for example, a branch conduit having a dimension of, for instance, 4 cm. (generally the smallest dimension occurring in a suction ditch) may be coupled with the greatest ease to a trunk conduit of 25 cm. (the largest dimension of terra cotta conduits). In draining, the methods now used are beset with numerous drawbacks caused by breakage and subsequent costs in connection therewith, that the application of such methods, i. e. the coupling of a small branch conduit to a trunk conduit of large dimensions, is frequently prohibitive. Instead, one has frequently been compelled to depose smaller trunk conduits parallel to the larger conduit and, on both sides thereof, to which smaller trunk lines could be attached, whereupon the sundry pipe lines brought together into special walls with outlets of dimensions still larger than that of the first-mentioned trunk conduits.

Having now described my invention what I claim as new and desire to secure by Letters Patent is:

1. A coupling housing for the coupling of a trunk conduit and a branch conduit of a pipe system for the purpose of drainage, characterized by said coupling housing being provided with a through-passage intended to form a portion of the trunk conduit, proper, as well as with a circular aperture opening in a vertical wall, parallel to said passage and defining the bounds of the housing itself, said aperture being in direct communication with said through-passage, on a level so much higher than that of the passage that the liquid from the branch conduit will discharge freely into the through-passage, in order that the maximum drainage through the branch conduit shall be permitted to proceed without being disturbed by the water supply through the trunk conduit, and that the difference in elevation shall become as small as possible at all waterlevels the trunk- and branch conduit alike.

2. A coupling housing according to claim 1, characterized by that said aperture is constituted by a recess provided directly in the wall of the housing without any surrounding projecting parts on the remainder of the wall itself.

AXEL EFRAIM WELIN-BERGER.

REFERENCES CITED

The following references are of record in the file of this patent:

UNITED STATES PATENTS

| Number | Name | Date |
|---|---|---|
| 1,063,394 | Schmidt et al. | June 3, 1913 |
| 2,357,755 | Moll | Sept. 5, 1944 |
| 2,387,119 | Clerk | Oct. 16, 1945 |